United States Patent
Esquibel (10) Patent No.: US 8,550,944 B2
(45) Date of Patent: Oct. 8, 2013

(54) MULTI-SPEED SPROCKET ASSEMBLY

(75) Inventor: Patrick Esquibel, Paso Robles, CA (US)

(73) Assignee: SRAM, LLC, Chicago, IL (US)

( * ) Notice: Subject to any disclaimer, the term of this patent is extended or adjusted under 35 U.S.C. 154(b) by 950 days.

(21) Appl. No.: 12/568,020

(22) Filed: Sep. 28, 2009

(65) Prior Publication Data

US 2010/0081531 A1      Apr. 1, 2010

Related U.S. Application Data

(60) Provisional application No. 61/102,005, filed on Oct. 1, 2008.

(51) Int. Cl.
   *B62M 9/10*      (2006.01)
(52) U.S. Cl.
   USPC .......................................... 474/160
(58) Field of Classification Search
   USPC .................... 474/158, 160, 161, 164, 152
   See application file for complete search history.

(56) References Cited

U.S. PATENT DOCUMENTS

| | | | |
|---|---|---|---|
| 5,413,534 A | 5/1995 | Nagano | |
| 5,458,543 A | 10/1995 | Kobayashi | |
| 5,464,373 A | 11/1995 | Leng | |
| 5,738,603 A | 4/1998 | Schmidt et al. | |
| 6,007,442 A | 12/1999 | Schmidt | |
| 6,572,500 B2 | 6/2003 | Tetsuka | |
| 7,850,564 B2 | 12/2010 | Nonoshita | |
| 2002/0006842 A1 | 1/2002 | Tetsuka | |
| 2002/0086753 A1* | 7/2002 | Yahata | 474/160 |
| 2005/0282672 A1* | 12/2005 | Nonoshita | 474/161 |
| 2006/0094550 A1* | 5/2006 | Tetsuka | 474/160 |
| 2006/0258498 A1* | 11/2006 | Tabe et al. | 474/160 |
| 2007/0060428 A1 | 3/2007 | Meggiolan | |
| 2007/0213155 A1* | 9/2007 | Reiter et al. | 474/160 |
| 2009/0258740 A1* | 10/2009 | Valle | 474/160 |
| 2009/0279984 A1* | 11/2009 | Wu | 411/393 |

FOREIGN PATENT DOCUMENTS

| | | |
|---|---|---|
| FR | 2632599 | 12/1989 |
| TW | 462366 | 11/2001 |

* cited by examiner

*Primary Examiner* — William E Dondero
*Assistant Examiner* — Robert T Reese
(74) *Attorney, Agent, or Firm* — Milan Milosevic; Lisa Serdynski; Steven Courtright (57) ABSTRACT

A multi-speed sprocket assembly configured to receive a bicycle chain including a plurality of pairs of inner link plates, a plurality of pairs of outer link plates and plurality of rollers connecting the pairs of inner and outer link plates. The multi-speed sprocket assembly generally includes a smaller diameter sprocket and a larger diameter sprocket rotated about a rotation axis in a driving direction. The smaller and larger diameter sprockets include first and second pluralities of teeth spaced about their peripheries, respectively. The larger diameter sprocket has an inboard side including first and second projections axially extending therefrom. The second projection is disposed circumferentially aft, opposite the driving direction, and radially outwardly of the first projection. The first and second projections simultaneously support one outer link plate as the bicycle chain shifts from the smaller diameter sprocket to the larger diameter sprocket.

18 Claims, 9 Drawing Sheets

MULTI-SPEED SPROCKET ASSEMBLY

RELATED APPLICATION DATA

This application is a nonprovisional of U.S. application Ser. No. 61/102,005, filed Oct. 1, 2008, entitled "Multi-Speed Sprocket Assembly."

BACKGROUND OF THE INVENTION

This invention relates to bicycles and more particularly to a multi-speed sprocket including a larger diameter sprocket having chain-transfer regions for facilitating the shifting of a bicycle chain between sprockets.

SUMMARY OF THE INVENTION

One embodiment of the present invention provides a multi-speed sprocket assembly for receiving a bicycle chain including a plurality of pairs of inner link plates, a plurality of pairs of outer link plates and plurality of rollers connecting the pairs of inner and outer link plates. The multi-speed sprocket assembly generally includes a smaller diameter sprocket and a larger diameter sprocket rotated about a rotation axis. The smaller and larger diameter sprockets include first and second pluralities of teeth spaced about their peripheries, respectively. The larger diameter sprocket has an inboard side including first and second projections axially extending therefrom. The second projection is disposed circumferentially aft, opposite the driving direction, and radially outwardly of the first projection. The first and second projections simultaneously support one outer link plate as the bicycle chain shifts from the smaller diameter sprocket to the larger diameter sprocket.

The first projection has a first support surface sloped to form an acute angle with the rotation axis. The second projection has a second support surface substantially parallel to the rotation axis. The first and second projections are rivets. The second plurality of teeth includes first and second chain-receiving teeth. The first chain-receiving tooth is disposed adjacent to and circumferentially aft of the second projection. The second chain-receiving tooth is disposed circumferentially aft of the first chain-receiving tooth. The first and second chain-receiving teeth have shaved tips disposed radially inwardly of the adjacent teeth.

One embodiment of the present invention provides a multi-speed sprocket assembly for engaging a bicycle chain. The multi-speed sprocket assembly includes a smaller diameter sprocket and a larger diameter sprocket. The smaller and larger diameter sprockets rotate about a rotation axis. The larger diameter sprocket has a inboard side including a ridge defining a ridge plane perpendicular to the rotation axis. The ridge guides the bicycle chain as the bicycle chain shifts from the larger diameter sprocket to the smaller diameter sprocket. The inboard side of the larger diameter sprocket includes a recess disposed radially inwardly of the ridge and outboard of the ridge plane. The recess is disposed adjacent a portion of the bicycle chain engaged with the smaller diameter sprocket. The recess permits silent running of the chain. The recess is formed circumferentially about the rotation axis. The ridge is configured such that a radially outermost perimeter of a portion of the bicycle chain engaged with the smaller diameter sprocket is disposed radially inwardly of the ridge. The inboard side may include a concave contour extending radially from a tooth root to the ridge. The concave contour extends from the ridge and smoothly asymptotes into a vertical plane perpendicular to the rotation axis toward the tooth root. The concave contour extends circumferentially about the rotation axis.

These and other features and advantages of the present invention will be more fully understood from the following description of one or more embodiments of the invention, taken together with the accompanying drawings.

DETAILED DESCRIPTION

FIGS. 1-9 illustrate a multi-speed sprocket assembly 10 according to one embodiment of the present invention. The multi-speed sprocket assembly 10 may be mounted to a crank assembly (not shown) or a wheel hub (not shown). The multi-speed sprocket assembly 10 generally includes a smaller sprocket 12 and a larger sprocket 14 having a larger diameter and more teeth than the smaller diameter sprocket 12, the smaller and larger sprockets 12, 14 coaxially rotatable about a rotation axis X. In other sprocket assemblies, more than two sprockets may be used. The smaller and larger sprockets 12, 14 include first and second pluralities of teeth 16, 18 spaced about their peripheries, respectively. The larger sprocket 14 includes first and second projections 20, 22, in this embodiment first and second rivets, extending axially from an inboard (INBD) side 23 of the larger sprocket 14. The first and second projections 20, 22 facilitate the upshifting of a bicycle chain 24 from the smaller sprocket 12 onto the larger sprocket 14. The first and second projections 20, 22 support and lift the chain 24 as it is laterally urged by a derailleur (not shown) to upshift from the smaller sprocket 12 onto the larger sprocket 14. The bicycle chain 24 includes a plurality of pairs of inner link plates 26, a plurality of pairs of outer link plates 28 and a plurality of rollers 30 connecting the pairs of inner and outer link plates 26, 28.

Figure 1:
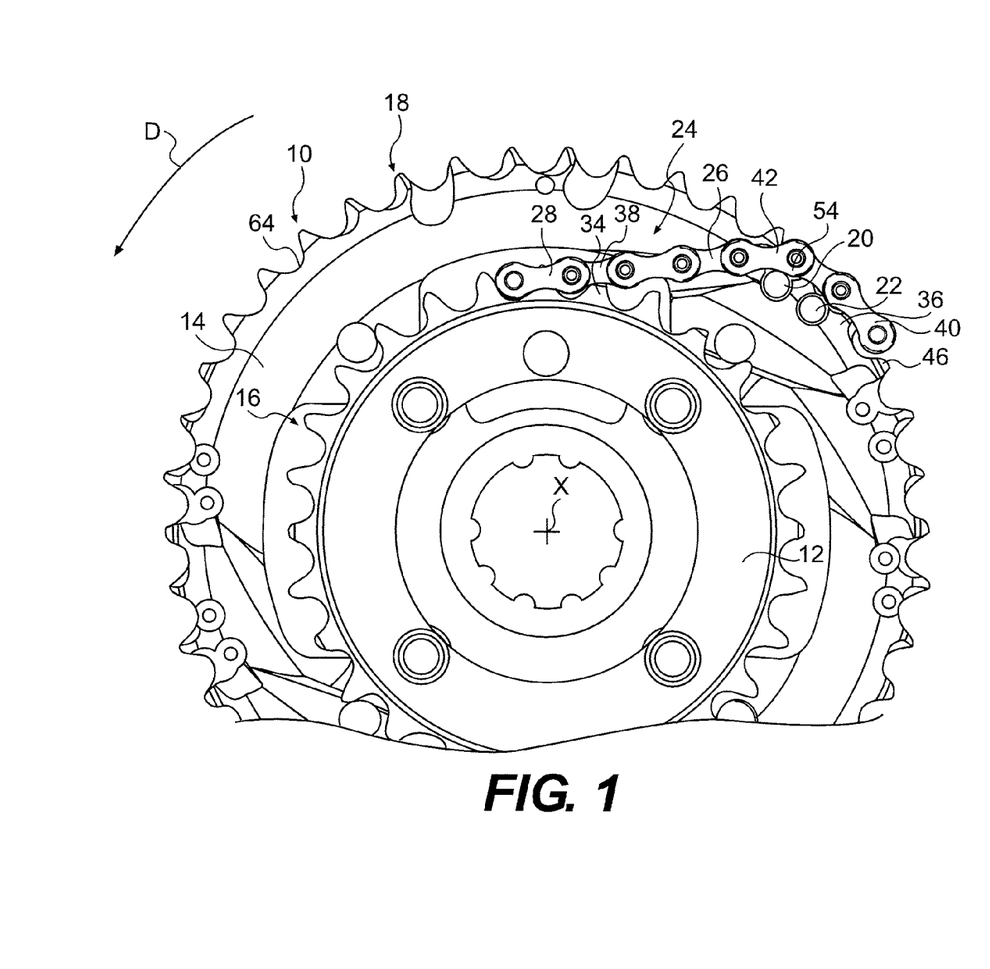
FIG. 1 is a side view of a multi-speed sprocket assembly according to one embodiment of the present invention showing a chain upshifting from a smaller sprocket onto a larger sprocket in a first latch position.
Figure 2:
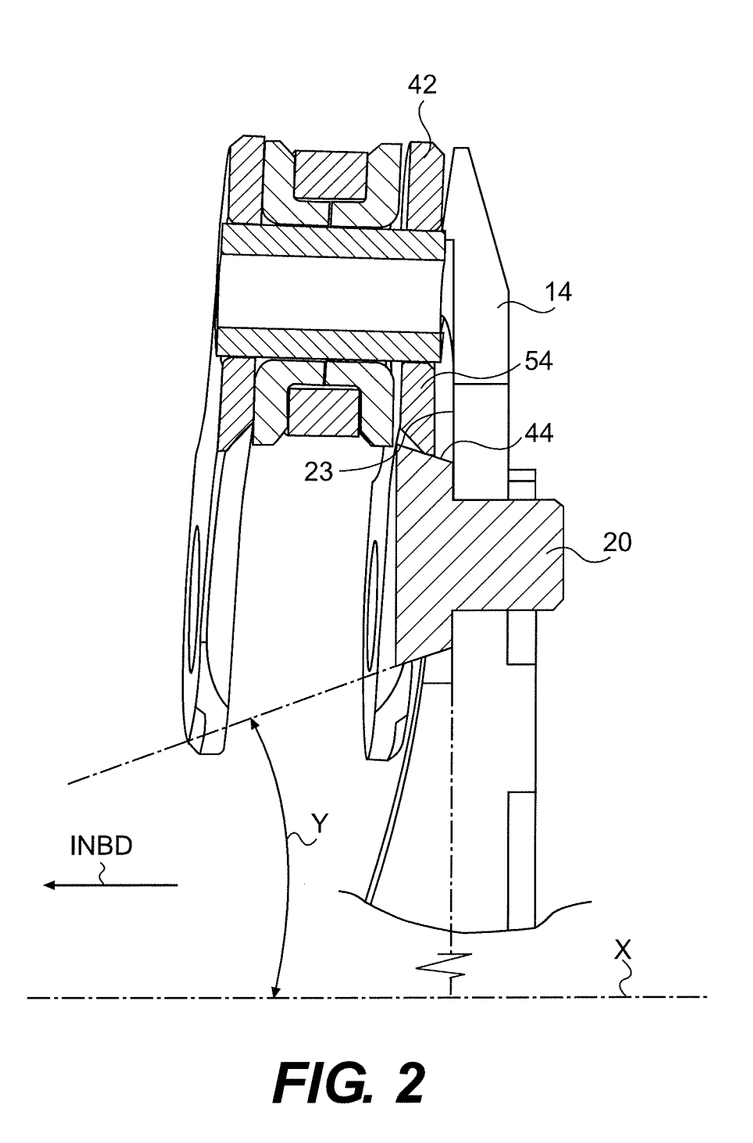
FIG. 2 is a cross-sectional view showing a first projection lifting an outer link plate of the chain during an upshift.
Figure 3A:
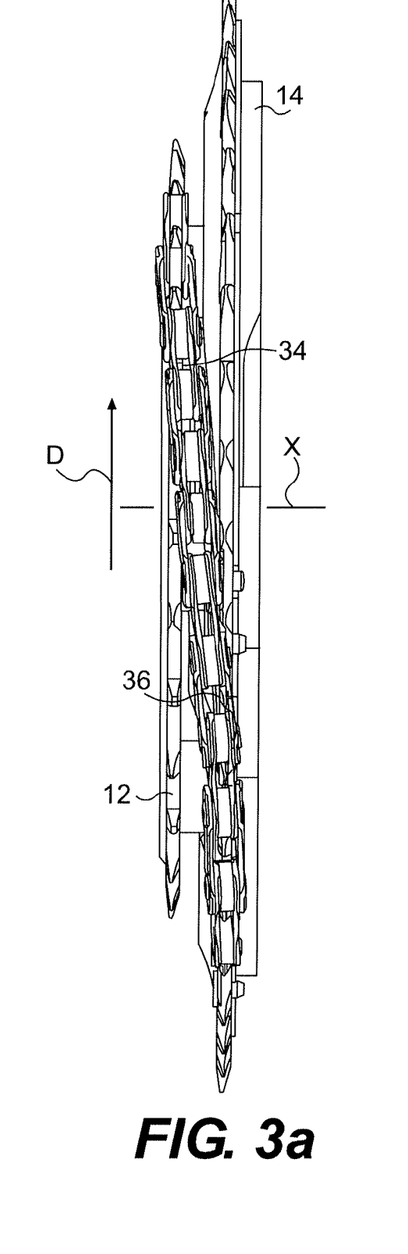
FIG. 3a is a top view of the multi-speed sprocket assembly of FIG. 1 showing the chain being upshifted from the smaller sprocket onto the larger sprocket.
Figure 3B:
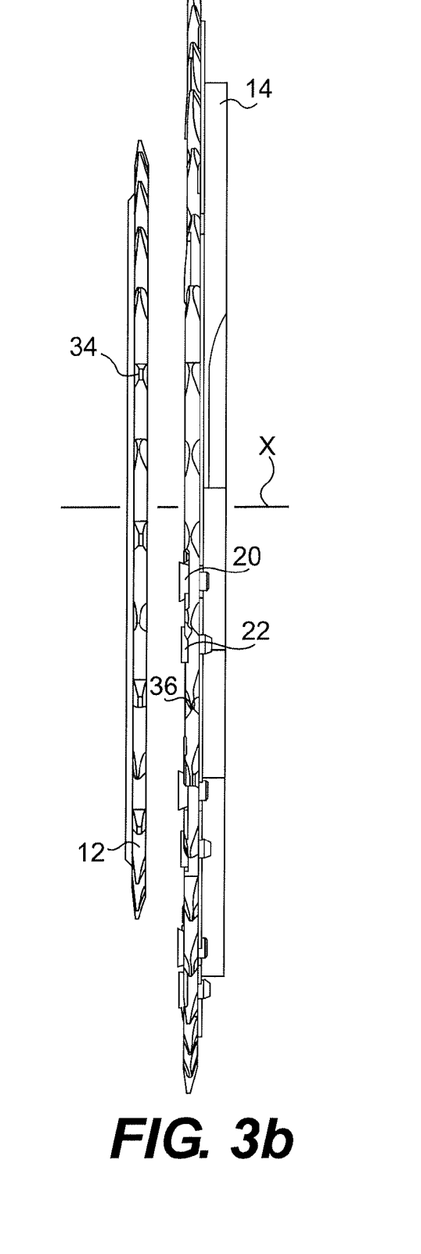
FIG. 3b is a top view of the multi-speed sprocket assembly of FIG. 3a with the chain removed.

Looking to FIGS. 1-3, the bicycle chain 24 is shown upshifting from the smaller sprocket 12 onto the larger sprocket 14 in a first latch position wherein a reference tooth 34 on the smaller sprocket 12 is engaged between a pair of inner link plates 38, and a first chain-receiving tooth 36 on the larger sprocket 14 is engaged between a pair of outer link plates 40. As the bicycle chain 24 is urged laterally by the derailleur during rotation of the sprocket assembly 10 in a direction D about the rotation axis X, a leading end 54 of the outer link plate 42 is supported and lifted by the first projection 20. Looking to FIG. 2, the leading end 54 of the outer link plate 42 is supported by a first support surface 44 of the first projection 20. In this embodiment, the first support surface 44 is sloped to form an acute angle Y with the rotation axis X. Upon further rotation, the pair of outer link plates 40 are aligned to engage the first chain-receiving tooth 36 therebetween to complete the upshift.

Figure 4:
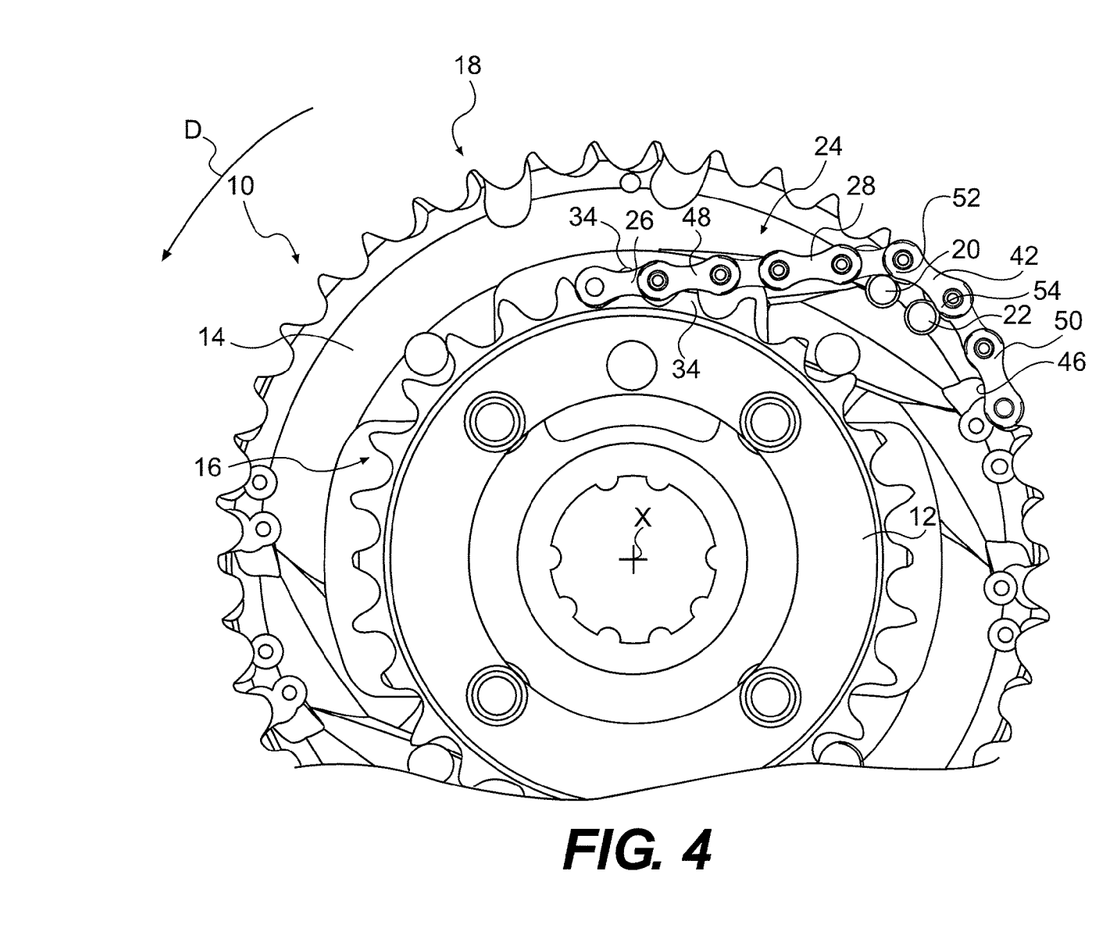
FIG. 4 is a side view of the multi-speed sprocket assembly showing the chain upshifting from a smaller sprocket onto a larger sprocket in a second latch position.
Figure 5:
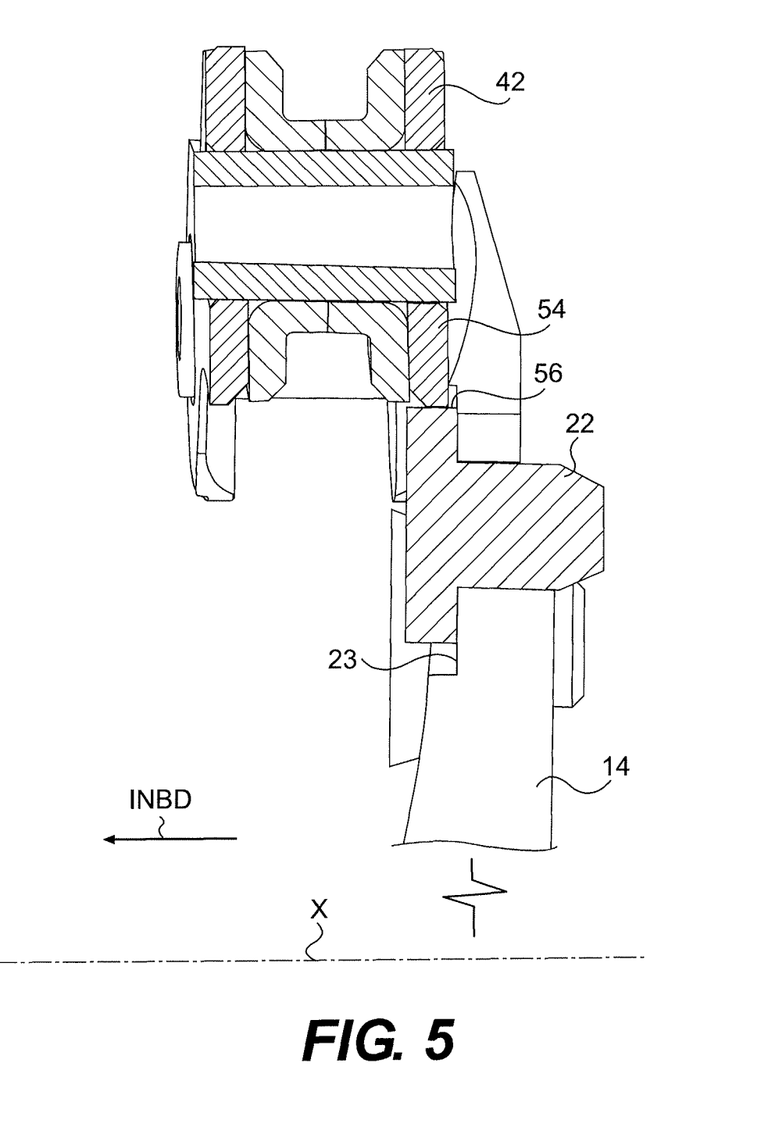
FIG. 5 is a cross-sectional view showing a second projection lifting the outer link plate of the chain during an upshift.
Figure 6A:
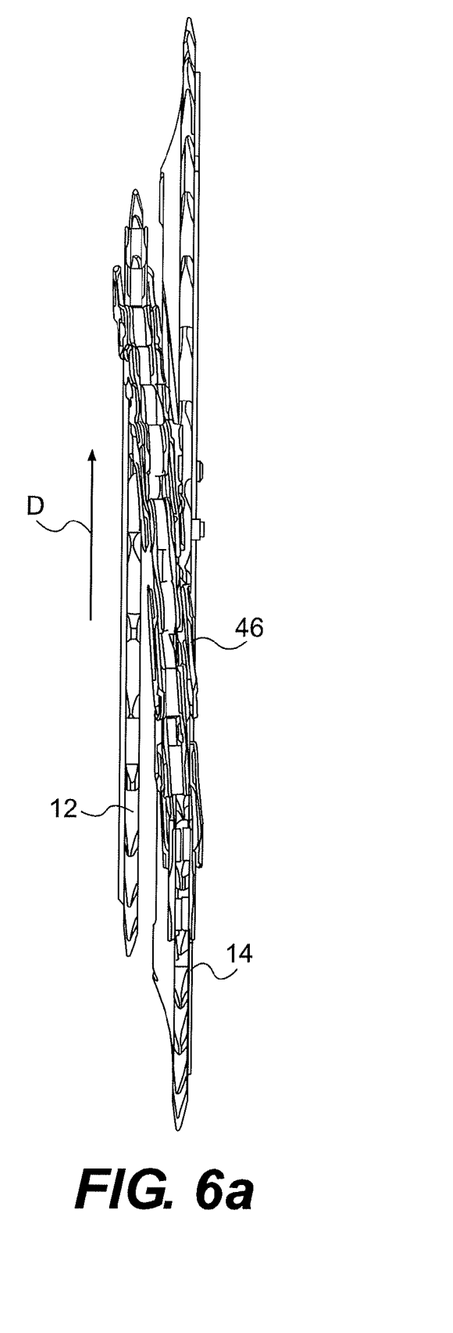
FIG. 6a is a top view of the multi-speed sprocket assembly of FIG. 4 showing the chain upshifting from the smaller sprocket onto the larger sprocket.
Figure 6B:
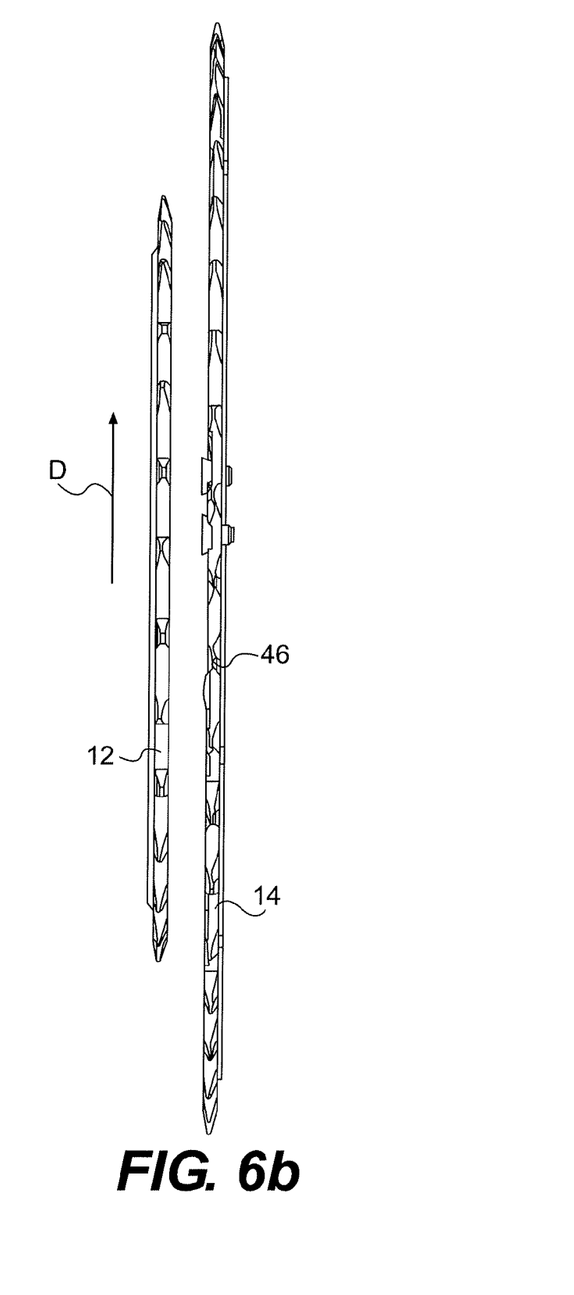
FIG. 6b is a top view of the multi-speed sprocket assembly of FIG. 6a with the chain removed.

Looking to FIGS. 4-6, the bicycle chain 24 is shown upshifting from the smaller sprocket 12 onto the larger sprocket 14 in a second latch position wherein the reference tooth 34 on the smaller sprocket 12 is engaged between a pair of outer link plates 48, and a second chain-receiving tooth 46 on the larger sprocket 14 is engaged between a pair of outer link plates 50. As the bicycle chain 24 is urged laterally by the derailleur during rotation of the sprocket assembly 10 in the direction D about the rotation axis X, a trailing end 52 of the outer link plate 42 is supported and lifted by the first projection 20 (similar to FIG. 2). Upon further rotation, the leading end 54 of the outer link plate 42 is supported by the second projection 22 while the first projection 20 continues to support the trailing end 52 of the outer link plate 42. Looking to FIG. 5, the leading end 54 of the outer link plate 42 is supported by a second support surface 56 of the second projection 22. In this embodiment, the second support surface 56 is substantially parallel to the rotation axis X. Upon yet further rotation, the pair of outer link plates 50 are aligned to engage the second chain-receiving tooth 46 to complete the upshift. In alternative embodiments, the first and second support surfaces 44, 56 may assume any combination sloped, straight or other profiles. Accordingly, the first projection 20 is configured to support the outer link plate 42 in both the first and second latch positions.

Figure 7:
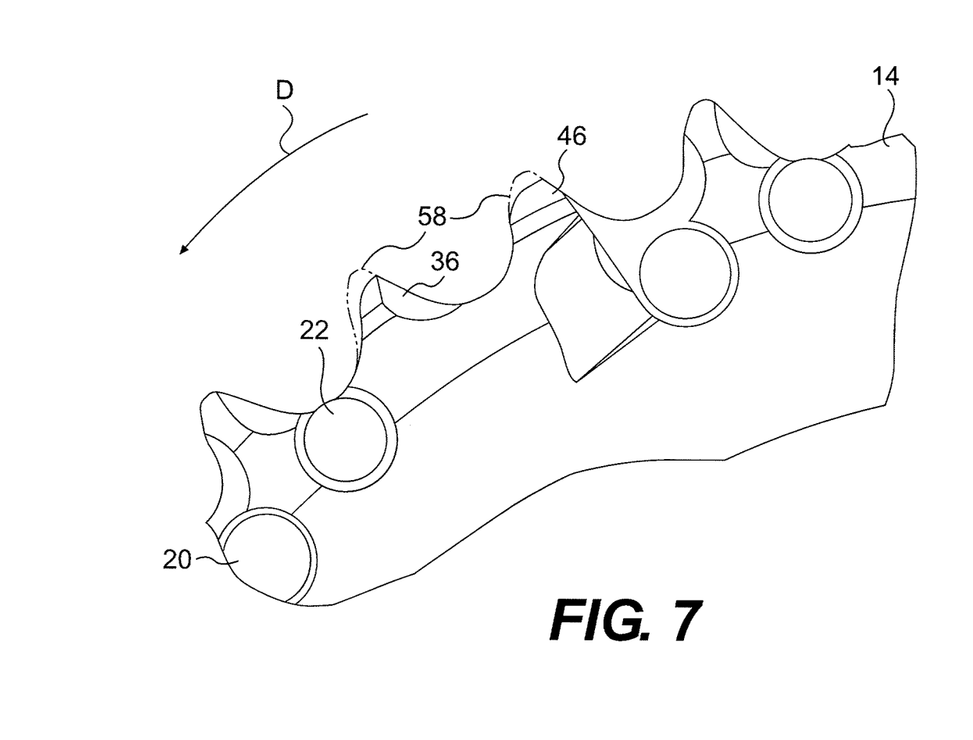
FIG. 7 is an enlarged view of chain-receiving teeth of the larger sprocket.

Looking to FIG. 7, the first and second chain-receiving teeth 36, 46 are shown in detail, the teeth 36, 46 being shaped and formed to more easily receive and positively engage the paired outer link plates 50. The chain-receiving teeth 36, 46 may be shaped in a variety of configurations, the phantom lines 58 showing the outline of the teeth 36, 46 prior to being shaped. In the embodiments shown, the tips of the teeth have been shaved to better receive the laterally displacing upshifting chain 24. The second projection 22 is disposed circumferentially aft, opposite the driving direction D, of the first projection 20. The first chain-receiving tooth 36 is disposed adjacent to and circumferentially aft of the second projection 22. The second chain-receiving tooth 46 is disposed circumferentially aft of the first chain-receiving tooth 36. In the embodiment shown, the second projection 22 is disposed radially outwardly of the first projection 20.

Figure 8:
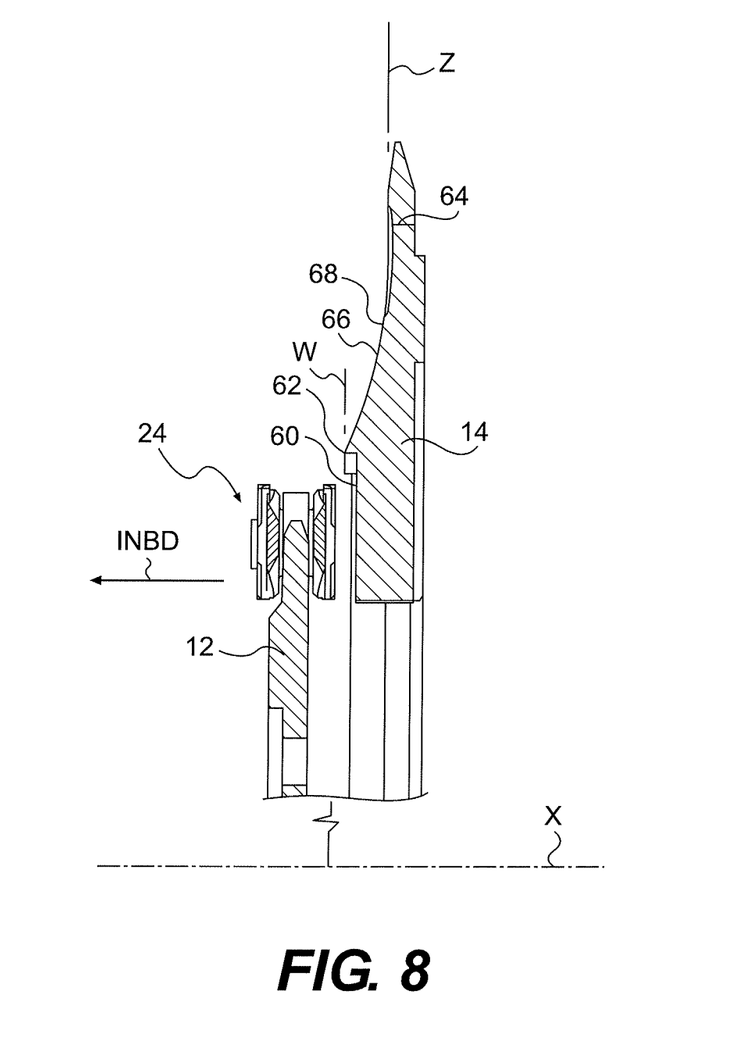
FIG. 8 is a cross-sectional view of the chain positioned on the smaller sprocket.
Figure 9:
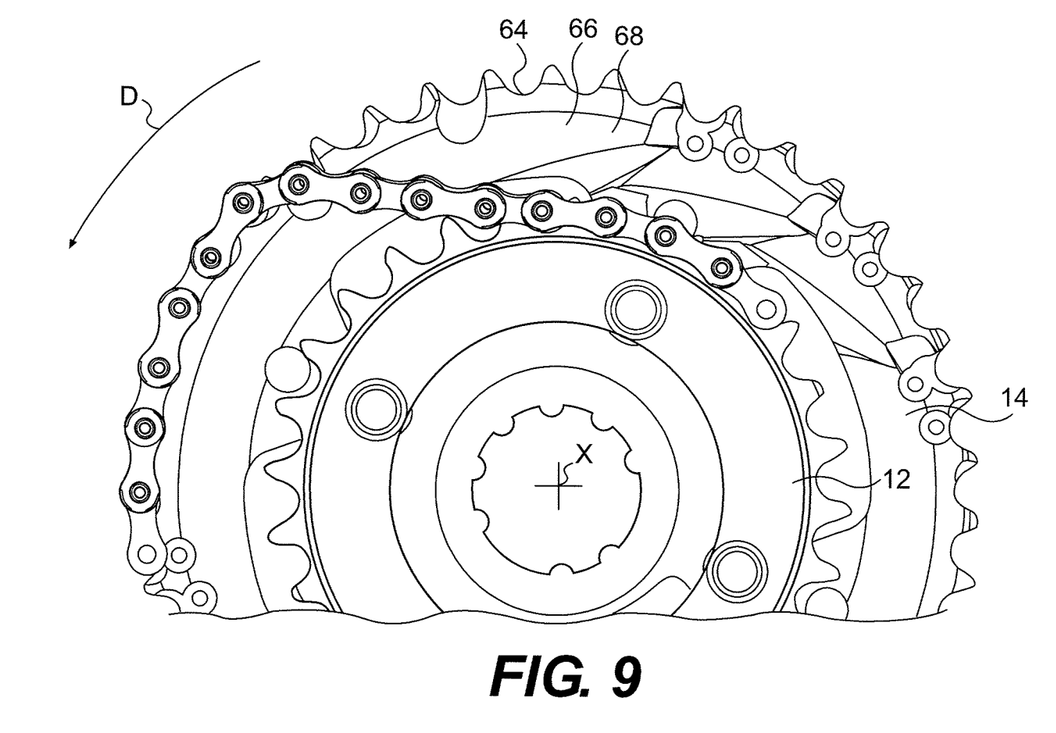
FIG. 9 is a side view of the multi-speed sprocket assembly showing the chain downshifting from the larger sprocket onto the smaller sprocket.

Looking to FIG. 8, the larger sprocket 14 includes a ridge 62 disposed on the inboard side of the larger sprocket 14, the ridge 62 defining a plane W perpendicular to the rotation axis X. Further, the larger sprocket 14 includes a recess 60 formed on the inboard side 23 of the larger sprocket 14, radially inwardly of the ridge 62 and outboard of the plane W. The chain 24 is shown engaged with the smaller sprocket 12. So positioned, the chain 24 is disposed adjacent to the recess 60, the recess 60 configured to permit silent running of the chain 24 while engaged on the smaller sprocket 12. In the embodiment shown, the recess 60 is formed circumferentially about the rotation axis X. Further, the radially outermost perimeter of a portion of the chain 24 engaged with the smaller sprocket 12 is disposed radially inwardly of the ridge 62.

Looking to FIG. 8, a concave contour 66 is formed on the inboard side 23 of the larger sprocket 14, the contour 66 radially disposed between a tooth root 64 and the ridge 62. In the embodiment shown, the contour 66 begins at the ridge 62 and smoothly asymptotes into a vertical plane Z perpendicular to the axis X as it extends toward the tooth root 64. So configured, the contour 66 smoothly guides the chain 24 while it downshifts laterally inboard and radially inwardly from the larger sprocket 14, over the ridge 62 and onto the smaller sprocket 12 (see FIG. 9). Accordingly, the contour 66 may assume any number of smoothly varying profiles including a large radius from the ridge 62 to the plane Z. In the embodiment shown, the contour 66 extends circumferentially about the axis X.

While this invention has been described by reference to an embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A multi-speed sprocket assembly for receiving a bicycle chain including a plurality of pairs of inner link plates, a plurality of pairs of outer link plates and plurality of rollers connecting the pairs of inner and outer link plates, the multi-speed sprocket assembly comprising:
   a smaller diameter sprocket having a first plurality of teeth spaced about a periphery thereof, the smaller diameter sprocket rotated about a rotation axis in a driving direction; and
   a larger diameter sprocket having a second plurality of teeth spaced about a periphery thereof, the larger diameter sprocket rotated about the rotation axis in the drive direction, the larger diameter sprocket having an inboard side including first and second projections axially extending therefrom, the second projection disposed circumferentially aft, opposite the driving direction, and radially outwardly of the first projection, the first and second projections simultaneously supporting the same outer link plate as the bicycle chain shifts from the smaller diameter sprocket to the larger diameter sprocket.

2. The multi-speed sprocket assembly of claim 1 wherein the first projection has a first support surface sloped to form an acute angle with the rotation axis.

3. The multi-speed sprocket assembly of claim 2 wherein the second projection has a second support surface substantially parallel to the rotation axis.

4. The multi-speed sprocket assembly of claim 3 wherein the first and second projections are rivets.

5. The multi-speed sprocket assembly of claim 3 wherein the second plurality of teeth include first and second chain-receiving teeth, the first chain-receiving tooth disposed adjacent to and circumferentially aft of the second projection, the second chain-receiving tooth disposed circumferentially aft of the first chain-receiving tooth.

6. The multi-speed sprocket assembly of claim 5 wherein the first and second chain-receiving teeth have shaved tips disposed radially inwardly of the adjacent teeth.

7. A multi-speed sprocket assembly for engaging a bicycle chain comprising:

a smaller diameter sprocket having a first plurality of teeth spaced about a periphery thereof, the smaller diameter sprocket rotated about a rotation axis; and a larger diameter sprocket having a second plurality of teeth spaced about a periphery thereof, the larger diameter sprocket rotated about the rotation axis, the larger diameter sprocket having an inboard side including a ridge defining a ridge plane perpendicular to the rotation axis, the ridge guiding the bicycle chain as the bicycle chain shifts from the larger diameter sprocket to the smaller diameter sprocket, the inboard side of the larger diameter sprocket including a recess disposed radially inwardly of the ridge and outboard of the ridge plane, the recess disposed adjacent a portion of the bicycle chain engaged with the smaller diameter sprocket, the recess permitting silent running of the chain.

8. The multi-speed sprocket assembly of claim 7 wherein the recess is formed circumferentially about the rotation axis.

9. The multi-speed sprocket assembly of claim 8 wherein the ridge is configured such that a radially outermost perimeter of a portion of the bicycle chain engaged with the smaller diameter sprocket is disposed radially inwardly of the ridge.

10. A multi-speed sprocket assembly for engaging a bicycle chain comprising:

a smaller diameter sprocket having a first plurality of teeth spaced about a periphery thereof, the smaller diameter sprocket rotated about a rotation axis; and a larger diameter sprocket having a second plurality of teeth spaced about a periphery thereof, the larger diameter sprocket rotated about the rotation axis, the larger diameter sprocket having an inboard side including a ridge defining a ridge plane perpendicular to the rotation axis, the ridge guiding the bicycle chain as the bicycle chain shifts from the larger diameter sprocket to the smaller diameter sprocket, the inboard side including a concave contour extending radially from a tooth root to the ridge.

11. The multi-speed sprocket assembly of claim 10 wherein the concave contour extends from the ridge and smoothly asymptotes into a vertical plane perpendicular to the rotation axis toward the tooth root.

12. The multi-speed sprocket assembly of claim 11 wherein the concave contour extends circumferentially about the rotation axis.

13. A multi-speed sprocket assembly for receiving a bicycle chain including a plurality of pairs of inner link plates, a plurality of pairs of outer link plates and plurality of rollers connecting the pairs of inner and outer link plates, the multi-speed sprocket assembly comprising:

a smaller diameter sprocket having a first plurality of teeth spaced about a periphery thereof, the first plurality of teeth including a reference tooth, the smaller diameter sprocket rotated about a rotation axis in a drive direction; and a larger diameter sprocket having a second plurality of teeth spaced about a periphery thereof, the second plurality of teeth including first and second chain-receiving teeth, the larger diameter sprocket rotated about the rotation axis in the drive direction, the larger diameter sprocket having an inboard side including first and second projections axially extending therefrom, the second projection disposed circumferentially aft, opposite the drive direction, and radially outwardly of the first projection, the first projection supporting a leading end of an outer link plate of a first pair of outer link plates when the reference tooth of the smaller sprocket engages between a pair of inner link plates and the first chain-receiving tooth engages between a second pair of outer link plates positioned aft of the first pair of outer link plates as the bicycle chain shifts from the smaller sprocket to the larger sprocket, the first projection supporting a trailing end of the outer link plate of the first pair of outer link plates, when the reference tooth of the smaller sprocket engages between a pair of outer link plates and the second chain-receiving tooth engages between the second pair of outer link plates as the bicycle chain shifts from the smaller sprocket to the larger sprocket.

14. The multi-speed sprocket assembly of claim 13 wherein the second projection supports the leading end of the outer link plate of the first pair of outer link plates when the first projection supports the trailing end of the outer link plate of the first pair of outer link plates.

15. The multi-speed sprocket assembly of claim 14 wherein the first projection has a first support surface sloped to form an acute angle with the rotation axis.

16. The multi-speed sprocket assembly of claim 15 wherein the second projection has a second support surface substantially parallel to the rotation axis.

17. The multi-speed sprocket assembly of claim 16 wherein the first and second projections are rivets.

18. The multi-speed sprocket assembly of claim 17 wherein the second plurality of teeth include first and second chain-receiving teeth, the first chain-receiving tooth disposed adjacent to and circumferentially aft of the second projection, the second chain-receiving tooth disposed circumferentially aft of the first chain-receiving tooth.

* * * * *